R. V. EVES.
HACKLING MACHINE FOR FLAX AND OTHER LIKE FIBERS.
APPLICATION FILED JAN. 9, 1911.

1,083,928.

Patented Jan. 13, 1914.
9 SHEETS—SHEET 1.

WITNESSES

INVENTOR
Reginald V. Eves
by James L. Norris
Atty.

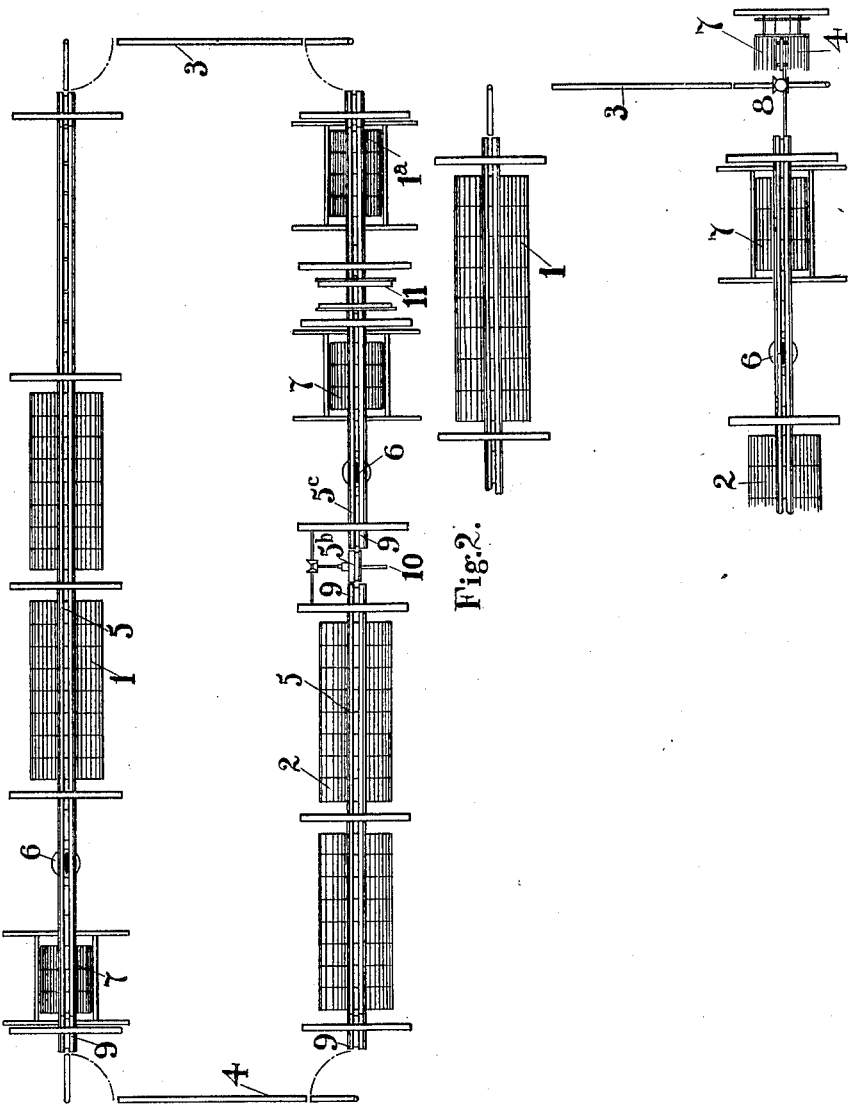

R. V. EVES.
HACKLING MACHINE FOR FLAX AND OTHER LIKE FIBERS.
APPLICATION FILED JAN. 9, 1911.

1,083,928.

Patented Jan. 13, 1914.

9 SHEETS—SHEET 4.

WITNESSES

INVENTOR

R. V. EVES.
HACKLING MACHINE FOR FLAX AND OTHER LIKE FIBERS.
APPLICATION FILED JAN. 9, 1911.

1,083,928.

Patented Jan. 13, 1914.
9 SHEETS—SHEET 8.

WITNESSES

INVENTOR
Reginald V. Eves

R. V. EVES.
HACKLING MACHINE FOR FLAX AND OTHER LIKE FIBERS.
APPLICATION FILED JAN. 9, 1911.

1,083,928.

Patented Jan. 13, 1914.

9 SHEETS—SHEET 9.

UNITED STATES PATENT OFFICE.

REGINALD VALENTINE EVES, OF BELFAST, IRELAND.

HACKLING-MACHINE FOR FLAX AND OTHER LIKE FIBERS.

1,083,928.  Specification of Letters Patent.  Patented Jan. 13, 1914.

Application filed January 9, 1911. Serial No. 601,714.

*To all whom it may concern:*

Be it known that I, REGINALD VALENTINE EVES, a British subject, residing at Belfast, county Antrim, Ireland, have invented certain new and useful Improvements in Hackling-Machines for Flax and other like Fibers, of which the following is a specification.

This invention relates to improvements in the now well known hackling machines in which the stricks of flax—clamped in holders—are passed between two revolving sheets of hackle pins to hackle one end, the stricks of flax being subsequently re-adjusted in the holders (by unscrewing the holders and drawing the flax through) and passed between the sheets of a second machine to hackle the other end, as described in the specification of Patent 775,352. During this hackling process a number of the flax fibers are broken so that when the process is finished the stricks contain a proportion of short fibers mainly near their centers, where they are gripped by the holder plates, and these short fibers or tow are removed by the sorters in the next process.

The object of this invention is to provide for removal of the short fibers from the centers of the stricks before they leave the hackling machines, and so enable a higher grade of flax to be produced and sent direct to the spread-board than hitherto, and the invention consists in the general construction and arrangement of the machinery for effecting such removal.

The invention will be fully described with reference to the accompanying drawings forming part of the specification.

Figure 1:
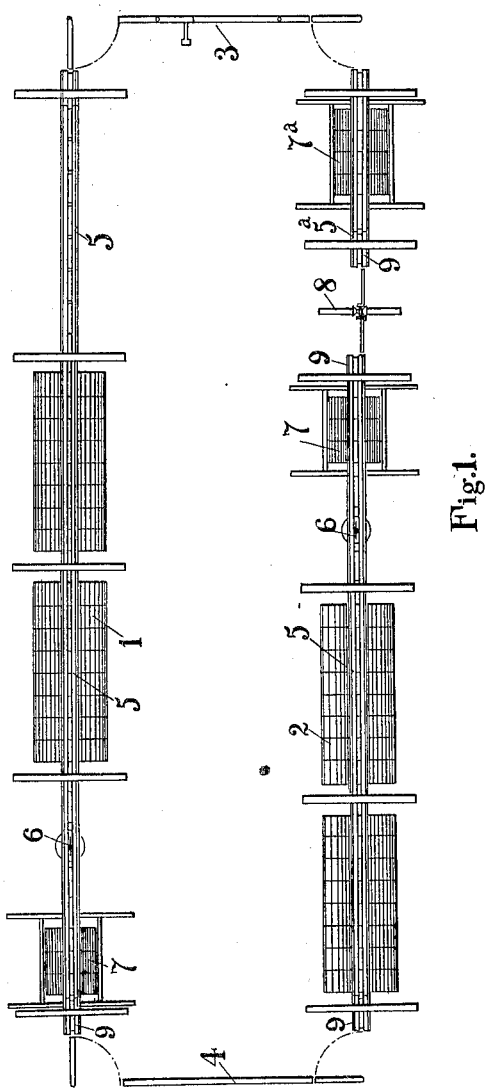
Figure 4:
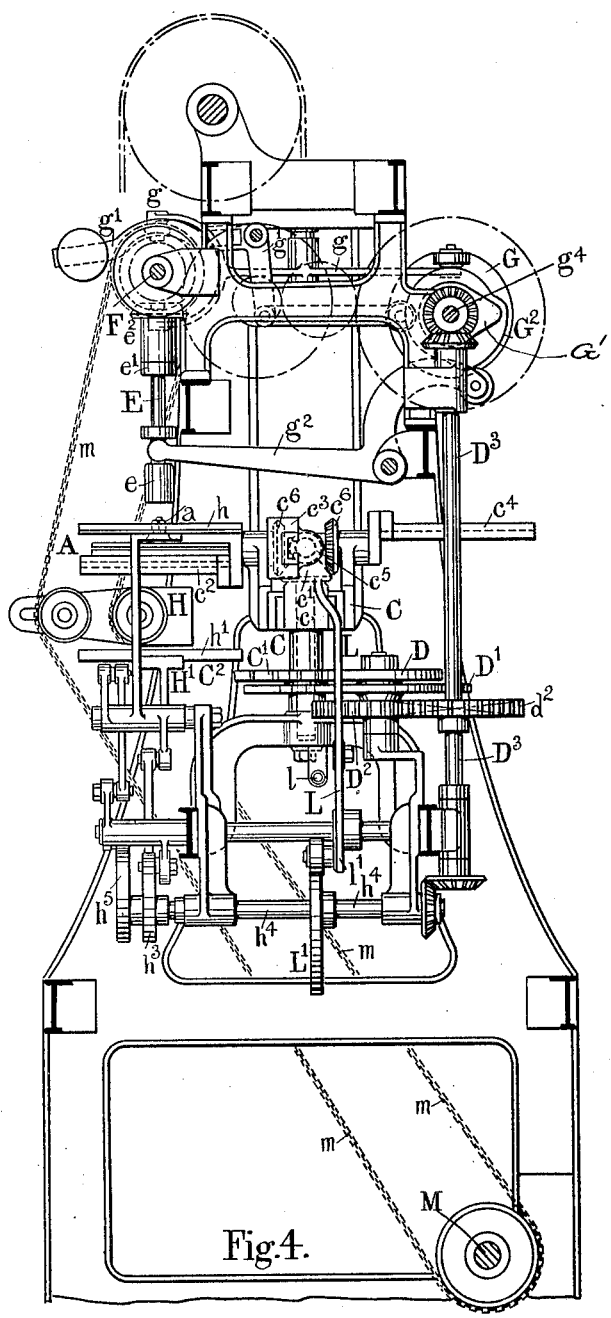
Figure 5:
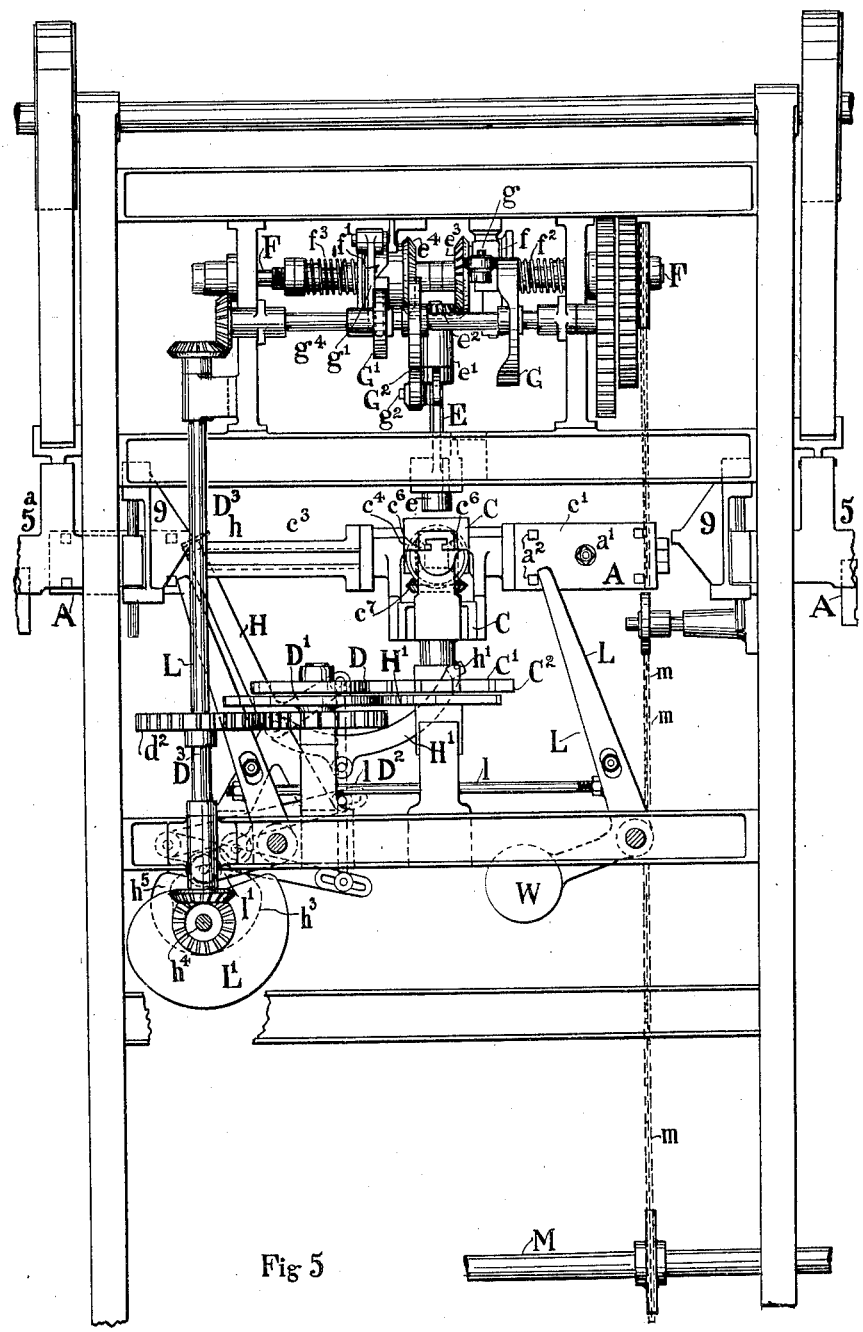
Figure 6:
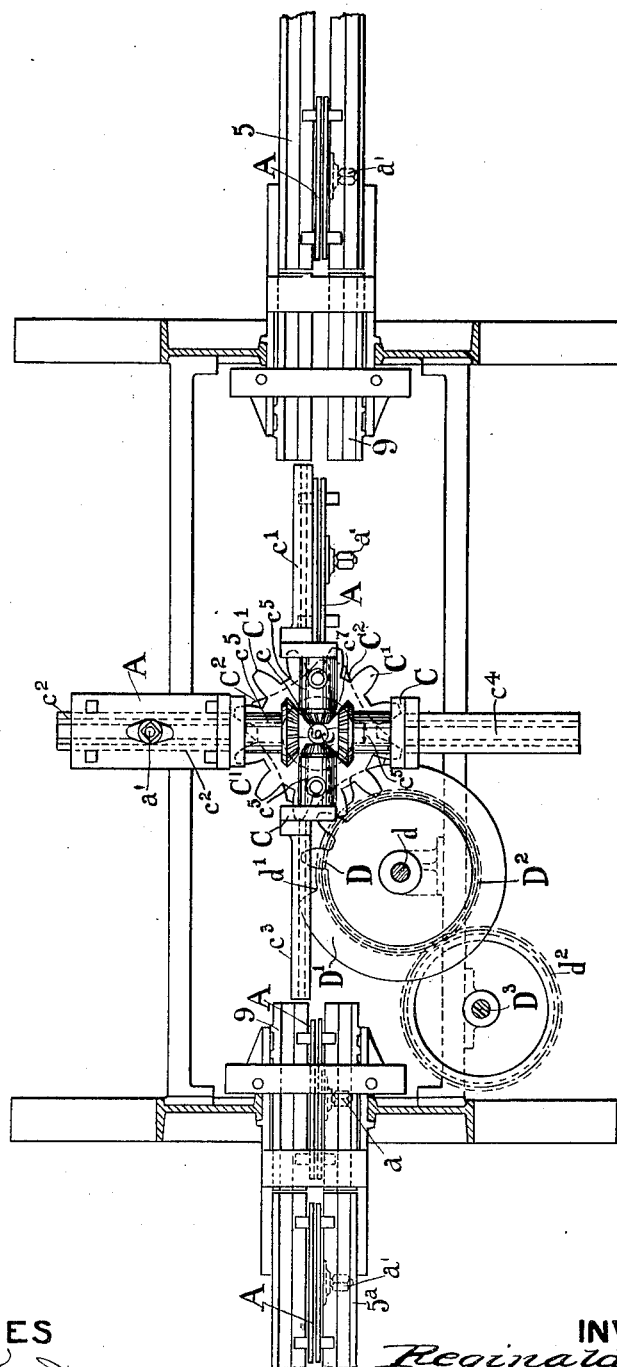
Figure 7:
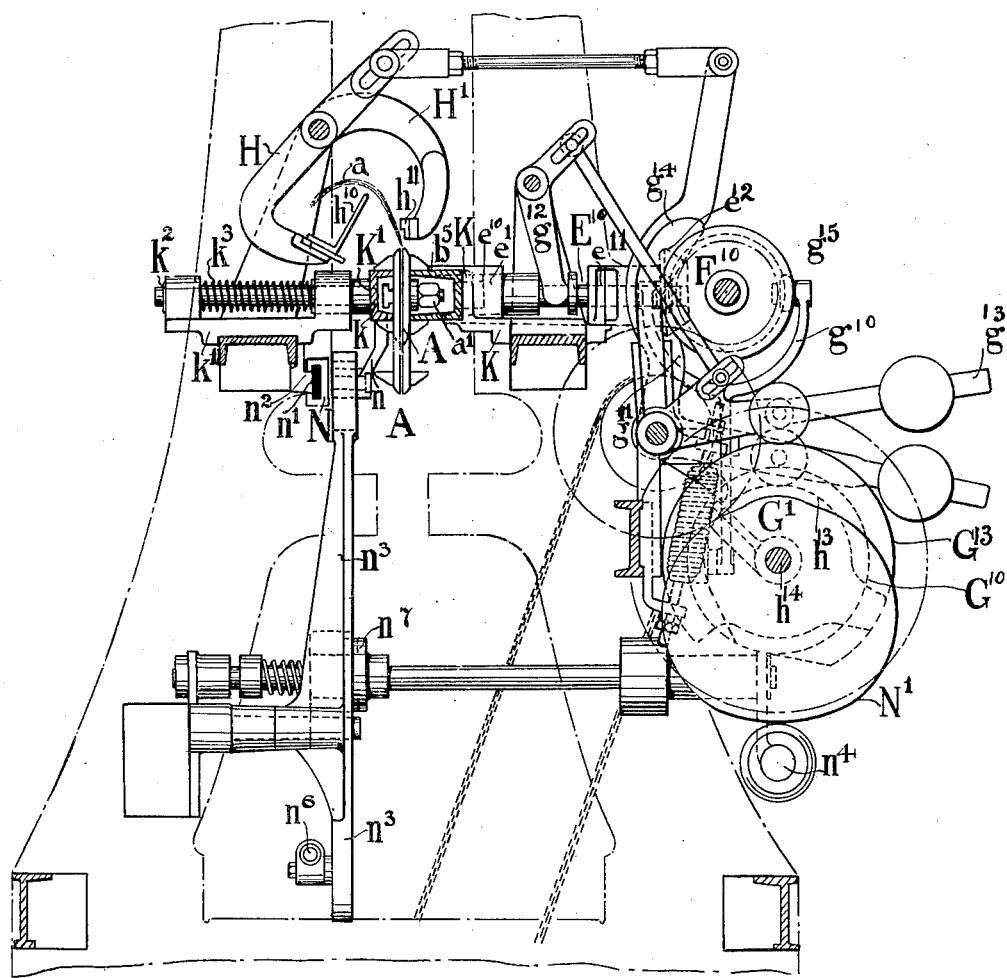
Figure 8:
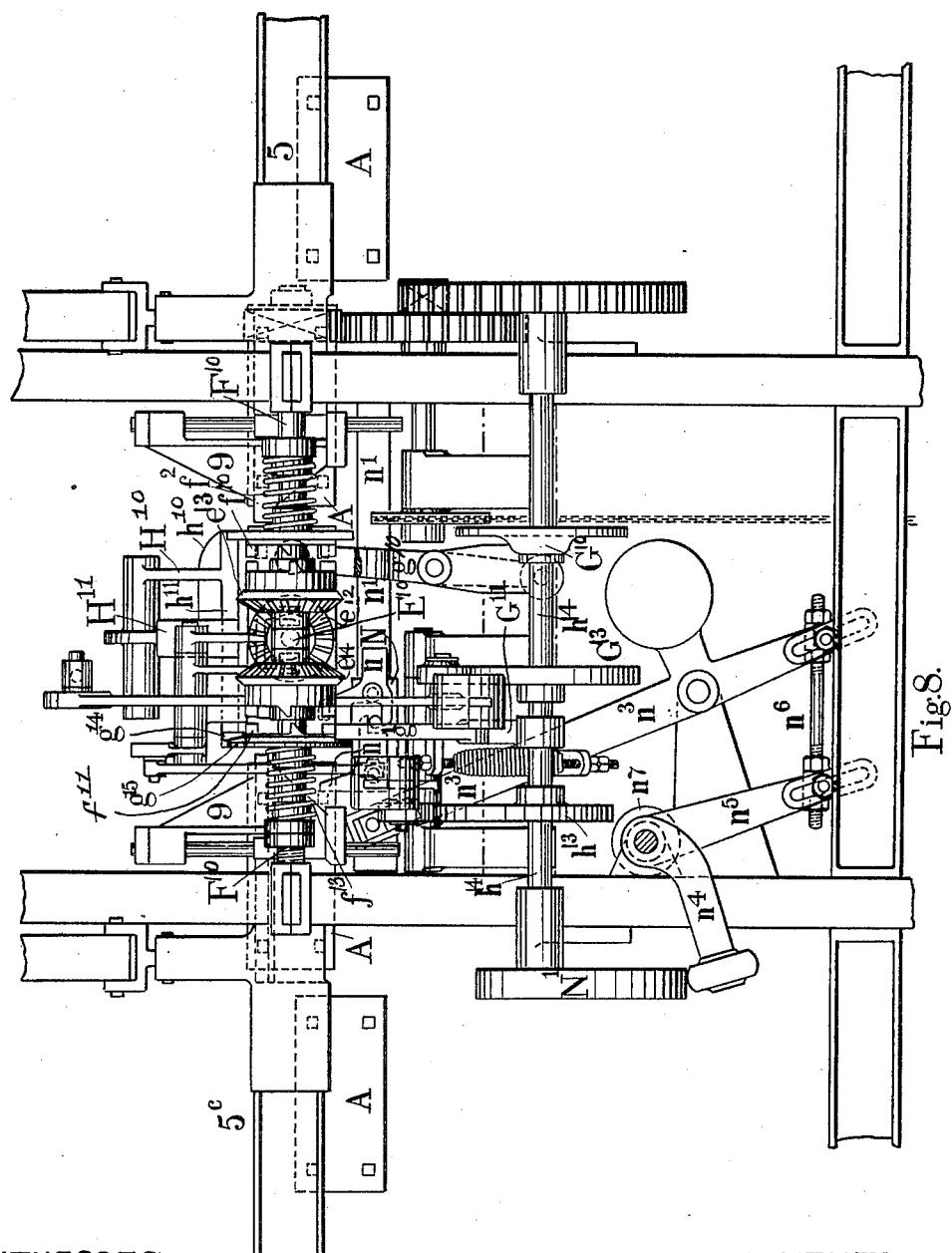
Figure 9:
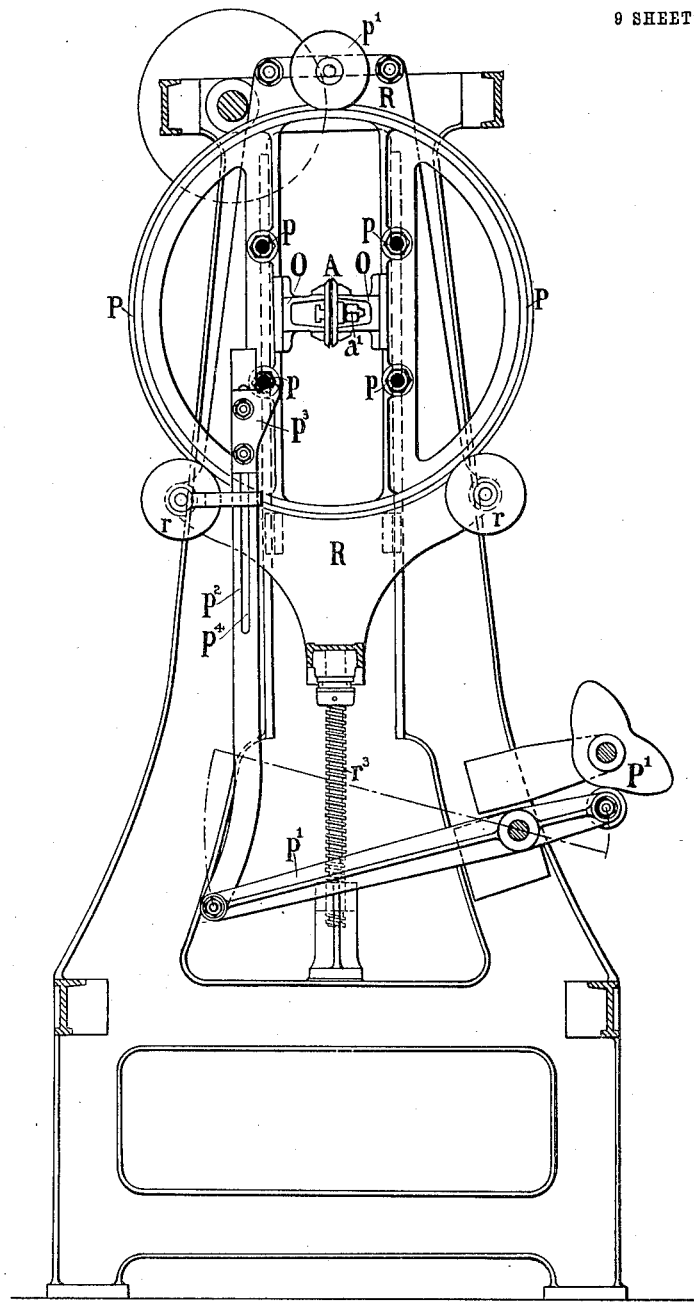
Figure 10:
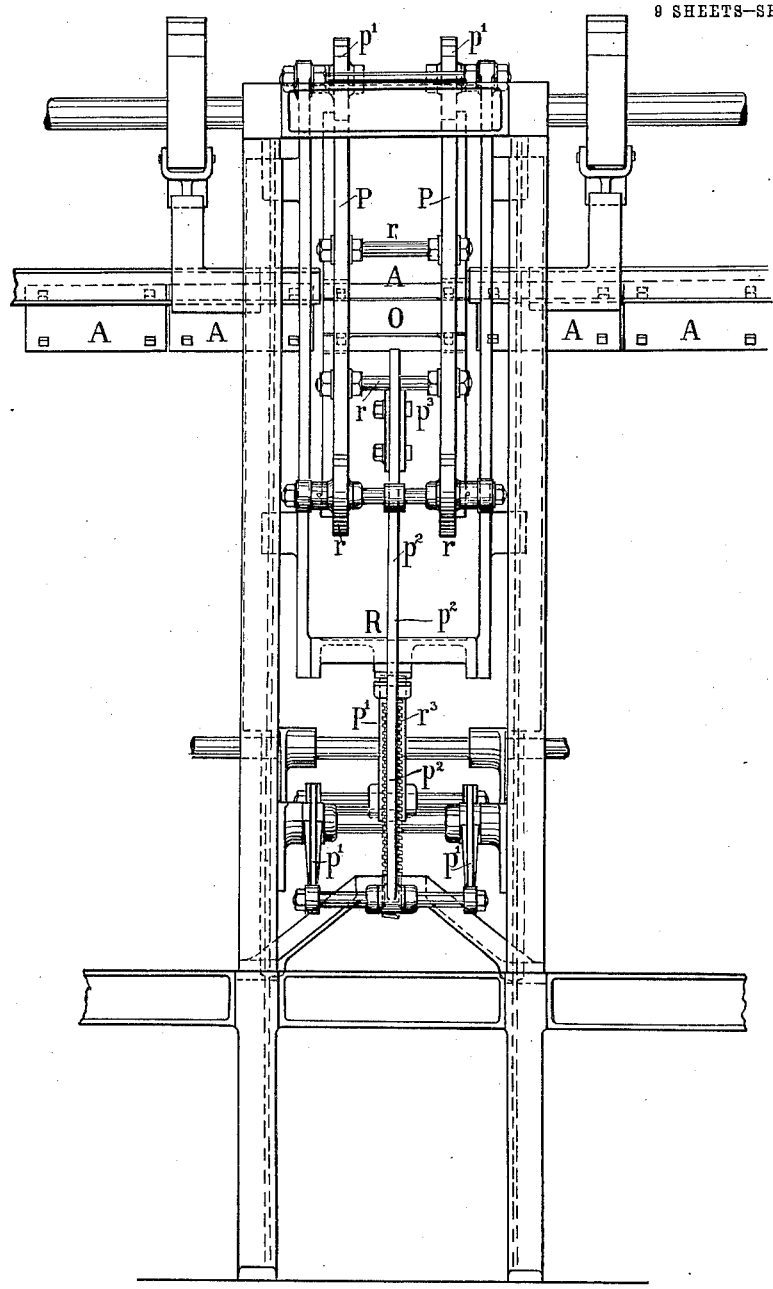

Figure 1. is a diagrammatic plan view of hackling machinery showing one form of the invention applied thereto. Fig. 2. is a similar view showing a modification of the invention. Fig. 3. is a fragmental diagrammatic plan view of a further modification. Fig. 4 is an end elevation of the automatic mechanism 8 of Fig. 1. for turning the holders and re-adjusting the flax stricks. Fig. 5. is a side elevation of same. Fig. 6. is a plan of part of same. Fig. 7. is an end elevation of the automatic mechanism 10 of Fig. 2. for unscrewing and rescrewing the flax holders and re-adjusting the flax stricks therein. Fig. 8. is a side elevation of same. Fig. 9. is an end elevation of the automatic mechanism 11 of Fig. 2 for turning the flax holders after the flax stricks have been re-adjusted therein. Fig. 10. is a side elevation of same.

In the arrangement shown in Fig. 1. a pair of hackling machines 1 and 2 of ordinary construction are placed with a cross channel 3 at one end where the holders are filled with the stricks of flax and a cross channel 4 at the other end where the holders are unscrewed and the position of the flax therein is changed (as described in Patent No. 775,352).

The longitudinal channels 5 of the two machines are elongated or extended, that of the machine 1—in which the root end of the flax is hackled—at the feed end to correspond with that of the other machine and at the charging end to enable a touch pin 6 (such as described with reference to Fig. 16 of English Patent No. 19,118 of 1903) and a finishing machine 7 for clearing the neps out of the ends to be inserted in the length of the machine before the flax and holders reach the changing cross channel 14. The finishing machine 7 is of well known form with two hackle sheets the tools in at least one row on each sheet being preferably of the kind described in Figs. 4 to 15 of English Patent No. 19,118 of 1903.

The longitudinal channel 5 of the second machine in which the tow end of the flax is hackled is elongated at the delivery end to enable a touch pin 6 and finishing machine 7 to be inserted, and an additional channel 5ª moving synchronously with the channel 5 is added to admit of the insertion of automatic mechanism 8 for turning the holders and readjusting the flax stricks therein (as hereinafter fully described) and an additional finishing or ending machine 7ª similar to the machine 7.

The mechanism 8 unscrews the holders re-adjusts the flax stricks therein and re-screws the holders the flax stricks being then gripped in the new position by the holders at the same part as is held by the hand of a hand hackler when clearing out the loose tow therefrom, and the machine 7ª cleans the short fibers or tow out of the centers of the flax-stricks. The ends of the longitudinal channels 5 and 5ª are fitted with suitable transfer tables 9 to enable the holders to be passed from one channel to another (such as described in English Patent No. 3,998 of 1908). If required the flax may be changed a second time in the holders by the use of another mechanism such as 8 and another finishing machine such as $7^a$.

The arrangement shown in Fig. 2 is similar to that shown in Fig. 1 in so far as relates to the hackling machine 1 and the cross channels 3 and 4. At the end of hackling machine 2 a short longitudinal stationary channel $5^b$ is placed—at a level with the bottom of the lift—along which the holders are passed in a vertical position and mechanism 10 is applied thereto for unscrewing and rescrewing the holders and for drawing the flax through in an upward direction to a suitable position (as previously indicated) for the short fibers to be removed therefrom. A second longitudinal reciprocating channel $5^c$ is placed at the end of the channel $5^b$ with a touch pin 6 for breaking the ends and a finishing machine 7 for clearing the ends of nep. A turning machine 11 is placed in the line of the channel 5 to invert the holder so that the middle of the strick which was drawn out of the holder by the mechanism 7 can be operated on by another finishing or ending machine $7^a$. The ends of the longitudinal channels are fitted with suitable transfer tables 9 to enable the holders to be passed from one channel to another (such as described in English Patent No. 3,998 of 1908). In this case too a second set of unscrewing and pulling through mechanism and a second turning over ring and a second finishing machine may be used.

The arrangement shown in Fig. 3 is very similar to that shown in Fig. 1 with the exception that the turn over mechanism 8 and the final finishing machine $7^a$ are placed at the delivery end of the machine the finishing machine being outside the channel 3 and the turn over mechanism delivering the holders to the cross channel.

The automatic mechanism 8 of Fig. 1, for turning the flax holders A and re-arranging the flax-stricks therein to permit of the loose fibers or tow being removed from the middle, see Figs. 4, 5 and 6, comprises a turn table C with four arms $c'$ $c^2$ $c^3$ $c^4$ placed between the ends of the channels 5 and $5^a$ the ends of the channels being provided with transfer tables 9 (such as described in English Patent 3,998 of 1908). The turn table C is mounted upon a vertical stud $c$ forming a pivot about which it can rotate and each of the arms $c'$ to $c^4$ is fitted upon a spindle $c^5$ mounted in a central bearing and capable of being rotated about its own axis. The turn table C is fitted with a pinion C' by which it is rotated by a train of wheels and upon the inner end of each spindle $c^5$ a bevel wheel $c^6$ is keyed which gears with a broad-faced stationary bevel wheel $c^7$ fixed to the upper end of the stationary stud $c$. As the turn table C rotates upon the stud $c$ the bevels $c^6$ roll upon the stationary bevel $c^7$ and rotate the arms $c'$–$c^4$ about their own axes so that they each make one complete revolution with each revolution of the turn table C. The arms $c'$–$c^4$ are channel shaped and form carriers for the flax holders A to transfer them from the channel 5 to the channel $5^a$. The rotation of the turn table C is intermittent and in the position shown in Fig. 6 the flax holder A in the arm or carrier $c'$ is vertical, that in the arm or carrier $c^2$ is horizontal, that in the arm or carrier $c^3$ is again vertical but reversed or turned over and the arm or carrier $c^4$ is empty or without a flax holder and is returning to the position of $c'$. The pinion C' of the turn table is rotated a quarter turn by the wheel D mounted on a stud $d$ gearing therewith. The gear D is provided with just sufficient teeth to rotate the pinion C through a quarter revolution and the pinion C' carries a locking plate $C^2$ with four faces to engage the rim of a locking disk D' keyed or otherwise affixed to the boss of the gear D, the disk being provided with a gap $d'$ to permit the locking plate $C^2$ to turn when the teeth on D engage with those of the pinion C.

A gear $D^2$ is keyed to the boss of the gear D and is driven by a gear $d^2$ keyed to the shaft $D^3$, making one revolution for each lift of the hackling machine. The gears $D^2$ and $d^2$ are of equal size so that gear D makes one revolution for each lift of the hackling machine. Any other form of gear may be employed to impart a quarter revolution to the turn table C and lock it in position at each lift of the machine.

Above the turn table C mechanism is mounted for unscrewing and rescrewing the nuts $a'$ of the flax holders A when in a horizontal position and for drawing the flax stricks through them, see Figs. 4 and 5. A vertical spindle E with a box key $e$ at its lower end carried in a bearing $e'$ is mounted so as to be raised and lowered and rotated about its axis first in one direction and then in the reverse direction. On its upper end the spindle E is fitted with a bevel gear $e^2$ through which it slides and which is driven in the direction for unscrewing the nut $a'$ by a bevel gear $e^3$ and in the direction for rescrewing the nut $a'$ by the bevel gear $e^4$ both mounted loosely on the constantly rotating shaft F. The bevel gear $e^3$ is driven at the proper time by the clutch $f$ and the gear $e^4$ by the clutch $f'$. The clutch $f$ is pressed into engagement with the bevel gear $e^3$ by a constantly acting spring $f^2$ the movement of the clutch being controlled by a cam G fixed to the cam shaft $g^4$ making one revolution of each lift of the hackling machine, and acting through a lever $g$, which allows the clutch to engage the bevel gear when the unscrewing of the nut commences and withdraws it when the unscrewing is complete. The clutch $f'$ is similarly operated by a spring $f^3$ and controlled by a cam $G'$ acting through a lever $g'$ which allows the clutch to engage the bevel gear $e^4$ when the rescrewing of the nut $a$ is required and the clutch slips out of gear and is held out by the lever $g'$ when the nut is screwed up the required tension.

The vertical key spindle E is raised and lowered to engage and disengage the nuts $a'$ of the flax holders A at the time required by a cam $G^2$ operating through the forked lever $g^2$ upon the spindle E.

The flax strick $a$ see Fig. 7 is drawn through the flax holder A when the nut $a'$ is unscrewed by a pair of gripping levers H H' which close upon the projecting ends of the strick, each lever being provided with a suitable gripping plate $h\ h'$. The lever H is operated and controlled by a cam $h^3$ keyed to the cam shaft $h^4$ which makes one revolution for each lift of the machine and the lever H' is operated and controlled by a cam $h^5$ also keyed to the cam shaft $h^4$. The cams $h^3$ and $h^5$ are so formed and timed that during the movement of the turn table C the levers H and H' are in the positions shown in Figs. 4 and 5 so as not to foul the arms $c'$–$c^4$ but immediately on the turntable C coming to rest and during the time the nut $a'$ is being unscrewed the levers H H' are brought into position to grip the strick and their further movement draws the strick the desired distance through the holder.

On the completion of the screwing up of the nut $a'$ by the key $e$ on the spindle E and the reclamping of the flax in the holder A the rotation of the turntable C is continued bringing the holder A which has been operated upon into line with the channel $5^a$ and ready to be carried forward.

The holders A are moved from the main channel 5 into the carrier arms $c'$–$c^4$ of the turntable C and from them into the channel $5^a$ by means of mechanism preferably consisting of a series of levers L the upper ends of which engage the lugs $a^2$ on the holders, (see Fig. 5). The levers L are linked together by a link $l$ and are operated by any suitable devices, as, for instance, a weight W to push the holders A forward and are moved back to starting point by a cam L' on the cam shaft $h^4$ acting through a lever $l'$ with a runner on the end.

The transfer tables are preferably of the type described in English Patent No. 3,998 of 1908.

The driving of the whole mechanism may be derived from a convenient positively driven shaft M through a pitch chain $m$ or suitable gearing.

The automatic mechanism 10 of Fig. 2 for unscrewing and rescrewing the flax holders A and for re-adjusting the flax-stricks therein is shown in Figs. 7 and 8.

A short stationary channel $5^b$ located as indicated in Fig. 2 is placed to receive the holders from the main channel 5 preferably at or near the bottom of the lift of the main channels. The channel $5^b$ is preferably constructed of members K, K' of trough section through which the head and nut $a'$ of the holder slide, the member K being affixed to the frame of the machine by suitable brackets and supports such as $k$. The member K' is mounted in a bracket $k'$ and is pressed against a stop washer $k^2$ or its equivalent by a spring $k^3$ to allow sufficient space between the members K and K' to admit of the holder A. The member K' can therefore be pressed backward against the pressure of the spring $k^3$.

At one side of the channel member K mechanism is mounted for unscrewing and rescrewing the nuts $a'$ of the holders A. A horizontal spindle $E^{10}$ with a box key $e^{10}$ at its outer end carried in a bearing $e^{11}$ is mounted so as to be moved to and fro and rotated about its axis first in one and then in the reverse direction. The key spindle $E^{10}$ is fitted with a bevel gear $e^{12}$ through which it slides and which is driven for unscrewing the nut $a'$ by a bevel gear $e^{13}$ and in the direction for rescrewing the nut $a'$ by the bevel gear $e^{14}$. The gears are both mounted loosely on the constantly rotating shaft $F^{10}$ and both remain continually in mesh with the gear $e^{12}$. The bevel gear $e^{12}$ is driven at the proper time by the clutch $f^{10}$ and the gear $e^{13}$, and afterward by the clutch $f^{11}$ and the gear $e^{14}$ both of which rotate with the shaft $F^{10}$. The clutch $f^{10}$ is pressed into engagement with the bevel gear $e^{13}$ by a constantly acting spring $f^2$ the movement of the clutch being controlled by a cam $G^{10}$ acting through a forked lever $g^{10}$ which allows the clutch to engage said gear $e^{13}$ when unscrewing the nut $a'$ commences, and withdraws it when unscrewing is complete. The clutch $f^{11}$ is similarly operated by a spring $f^{13}$ and controlled by a cam $G^{11}$ acting through a lever $g^{11}$ the end $g^{14}$ of which rests against the inclined face $g^{15}$ of the clutch $f^{11}$ and allows it to engage the clutch member of the bevel gear $e^{14}$ when the rescrewing of the nut $a'$ is required and when the screwing up is of the required tension, the clutch $f^{11}$ slips against the spring pressure, and the lever $g^{14}$ being moved down against the inclined face $g^{15}$ acts to keep the clutch out of gear.

The horizontal key spindle $E^{10}$ is moved to and fro to engage and disengage the nut $a'$ of the flax holder A at the time required by a cam $G^{13}$ operating upon the spindle $E^{10}$ through the forked lever $g^{12}$ and the weighted lever $g^{13}$ with a roller resting upon the periphery of the cam $G^{13}$.

The flax-strick $a$ is drawn upward through the flax holder A, when the nut $a'$ is unscrewed by a pair of gripping levers $H^{10}$ $H^{11}$ pivoted upon a shaft or stud—which close upon the projecting ends of the strick, each lever being provided with a suitable gripping plate $h^{10}$ $h^{11}$. The lever $H^{10}$ is controlled and operated by a cam $h^{13}$ keyed to the cam shaft $h^{14}$ and grips the flax when raised against the end of the levers $H^{10}$ and draws it through the holder. The cam is so shaped as to bring the gripper $h^{10}$ against the gripper $h^{11}$ to grip the flax, before the unscrewing commences to prevent the flax dropping from the holder; and the pulling through takes place after the unscrewing. The cam shaft $h^{14}$ carrying the several cams makes one revolution for each lift of the machine.

The flax holders A are moved from the main channel 5 and transfer or turn tables 9 by a catch bar or sliding bar N, to which are pivoted dogs or catches $n$ mounted on a bar $n'$ fixed to a bracket $n^2$ attached to the frame. The catch bar N is moved to and fro by the weighted lever $n^3$ rocked by a cam $N'$ on the cam shaft $h^{14}$ acting through the levers $n^4$ and $n^5$ to which the lever $n^3$ is connected by a link or rod $n^6$. A spring clutch such as $n^7$ may be applied to any of these levers to give way in case there is any obstruction to the passage of the flax holders A to prevent breakage. During the cycle of operations of unscrewing the nut of the holder re-adjusting the flax in the holder and rescrewing the nut the holder is held firmly in the channel $5^b$ by the member K being pressed against it by the spring.

The automatic mechanism 11 of Fig. 2 for turning the flax holder A after the stricks have been re-adjusted therein is shown in Figs. 9 and 10. A rotary channel or carrier O to receive the flax holders is mounted between two rings braced together by stays, or bolts $p$ forming a drum P. The flax holders are moved into the channel carrier O and the drum is rotated half a revolution at each lift of the machine. The drum P is mounted upon rollers $r$ and held in position thereon by top rollers $r'$ the runners being carried by an adjustable frame R mounted in guides in the main frame work of the machine.

The frame R is supported by a screw $r^3$ by which its height can be adjusted for any height of lift. The drum P is rotated by a cam $P'$ acting through the lever $p'$ and upright pawl $p^2$ the latter engaging the stay bolts $p$. The cam $P'$ has a double throw and the pawl $p^2$ is operated twice for each lift of the hackling machine rotating the holder one fourth revolution each time thus completing the turning over of the flax-holder each lift. The height of the upright pawl $p^2$ is adjusted by moving the bracket $p^3$ along the slot $p^4$ to suit any height of lift.

Any other suitable mechanism may be adopted for rotating the drum P and channel O half a revolution each lift of the machine.

The drum P is set so that the channel carrier O is level with the top position of the main channel and the holder A is pushed into the channel carrier O by the holder behind it, the holders being traversed forward by the ordinary well known catch bar of the hackling machine.

What I claim as my invention and desire to protect by Letters Patent is:—

1. In apparatus for hackling flax or other fibers the combination with two hackling machines placed parallel, holders for carrying the stricks of flax and means for changing the stricks in the holders and for transferring the flax holders from one machine to the other, of a touch pin and a finishing machine in line with the first machine, and a touch pin, finishing machine, and changing mechanism for reversing the ends of the stricks in the holders, and an auxiliary dressing machine, in line with the second machine substantially as described.

2. In apparatus for hackling flax and other fibers the combination with two hackling machines placed parallel, holders for carrying the stricks of flax and means for changing the stricks in the holders and for transferring the flax holders from one machine to the other, of means by which the flax stricks in the holders are re-adjusted and the holders turned over or inverted and placed at the end of the hackling machine, and mechanism by which the short ends of fiber are removed from the center of the stricks after the flax has been hackled, substantially as described.

3. In apparatus for hackling flax and other fibers the combination with two hackling machines placed parallel, holders for carrying the stricks of flax, and means for changing the stricks in the holders and for transferring the flax holders from one machine to the other, of a rotary turn table constructed with four arms, and means for rotating each arm about its longitudinal axis to turn over and invert the holders, substantially as described.

4. In apparatus for hackling flax and other fibers the combination with two hackling machines placed parallel, holders for carrying the stricks of flax and means for changing the stricks in the holders and for transferring the flax holders from one machine to the other, of a rotary turn table provided with arms, means to rotate the turn table, means to rotate each arm of said turn table about its longitudinal axis, mechanism by which the holder nuts are unscrewed and rescrewed, and mechanism for drawing the stricks of flax through the holders, substantially as described.

5. In apparatus for hackling flax and other fibers the combination with two hackling machines placed parallel, holders for carrying the stricks of flax and means for changing the stricks in the holders and for transferring the flax holders from one machine to the other, of a rotary turn table provided with four radial arms to carry the flax holders, each arm capable of rotation about its longitudinal axis, a pivot upon which the turn table rotates, a central pinion by which the turn table is rotated, a train of gears to drive the pinion intermittently, a stationary bevel gear concentric with the pivot around which the turn table rotates, and a bevel gear on each radial arm meshing with the stationary gear to rotate the arms, substantially as described.

6. In apparatus for hackling flax and other fibers the combination with two hackling machines placed parallel, holders for carrying the stricks of flax and means for changing the stricks in the holders and for transferring the flax holders from one machine to the other, of a rotary turn table provided with four radial arms to carry the flax holders, each arm capable of rotation about its longitudinal axis, a pivot upon which the turn table rotates, a central pinion by which the turn table is rotated, a train of gears to drive the pinion intermittently, a stationary bevel gear concentric with the pivot around which the turn table rotates, and a bevel gear on each radial arm meshing with the stationary gear to rotate the arms, a box key for unscrewing and rescrewing the nuts of the flax holders, a spindle to carry the box key, bevel gears fitted to the end of the spindle, bevel gears by which the key is driven, clutches engaging the last mentioned gears, and cams and suitable connecting means to throw the clutches into and out of gear, substantially as described.

7. In apparatus for hackling flax and other fibers the combination with two hackling machines placed parallel, holders for carrying the stricks of flax and means for changing the stricks in the holders and for transferring the flax holders from one machine to the other, of a rotary turn table provided with four radial arms to carry the flax holders, each arm capable of rotation about its longitudinal axis, a pivot upon which the turn table rotates, a central pinion, by which the turn table is rotated, a train of gears to drive the pinion intermittently, a stationary bevel gear concentric with the pivot around which the turn table rotates, and a bevel gear on each radial arm meshing with the stationary gear to rotate the arms, a box key for unscrewing and rescrewing the nuts of the flax holders, a spindle to carry the box key, bevel gears fitted to the end of the spindle, bevel gears by which the key is driven, clutches engaging the last mentioned gears and cams and suitable connecting means to throw the clutches into and out of gear, levers by which the flax stricks are gripped to draw them through the holders, a cam to operate one of said levers and a second cam to operate the other lever, substantially as described.

8. In apparatus for hackling flax and other fibers the combination with two hackling machines placed parallel, holders for carrying the stricks of flax and means for changing the stricks in the holders and for transferring the flax holders from one machine to the other, of a rotary turn table provided with four radial arms to carry the flax holders, each arm capable of rotation about its longitudinal axis, a pivot upon which the turn table rotates, a central pinion by which the turn table is rotated, a train of gears to drive the pinion intermittently, a stationary bevel gear concentric with the pivot around which the turn table rotates, and a bevel gear on each radial arm meshing with the stationary gear to rotate the arms, a box key for unscrewing and rescrewing the nuts of the flax holder, a spindle to carry the box key $e$, bevel wheels $e^2$ fitted to the end of the spindle, bevel gears by which the key is driven, clutches engaging the last mentioned gears and cams and suitable connecting means to throw the clutches into and out of gear, levers by which the flax stricks are gripped to draw them through the holders, a cam to operate one of said levers, a second cam to operate the other lever, and a finishing machine to remove the loose ends of flax after the stricks pass from the turn table, substantially as described.

9. A transfer mechanism for the flax holders in hackling machines comprising a turn table having carrier arms extending therefrom, bevel gears at the inner extremities of said carrier arms, a stationary gear with which the gears on the carrier arms engage whereby the carrier arms are rotated about their longitudinal axes, means to rotate the turn table, and means on the carrier arms for engaging the flax holders.

In testimony whereof I have hereunto set my hand in presence of two subscribing witnesses.

REGINALD VALENTINE EVES.

Witnesses:
　EDWARD BENNETT,
　FREDK. W. DOWNEY.

---

Copies of this patent may be obtained for five cents each, by addressing the "Commissioner of Patents, Washington, D. C."